United States Patent [19]
Schmitt

[11] 3,763,637
[45] Oct. 9, 1973

[54] REVERSIBLE CHASSIS FOR SELF-PROPELLING COMBINES

[76] Inventor: Helwig Schmitt, Raiffeisenstr. 5, Grebenstein, Germany

[22] Filed: Jan. 17, 1972

[21] Appl. No.: 218,185

[52] U.S. Cl................................... 56/228, 280/415
[51] Int. Cl............................................ A01d 75/22
[58] Field of Search..................... 56/228; 172/240, 172/242, 243, 244; 280/415–418

[56] References Cited
UNITED STATES PATENTS

| | | | |
|---|---|---|---|
| 1,761,265 | 6/1930 | Harris et al. | 56/228 |
| 1,919,440 | 7/1933 | MacGregor et al. | 56/228 |
| 256,484 | 4/1882 | Jones | 56/228 |
| 382,910 | 5/1888 | Shickle | 56/228 |

Primary Examiner—Russell R. Kinsey
Attorney—Stein & Orman

[57] ABSTRACT

A combine of the type designed to harvest grain-type crops and including a self-propelled chassis having adjustably mounted thereon at least one axle capable of being selectively positioned in either of two operative positions which are arranged substantially perpendicular to one another thereby allowing the combine to be driven in a direction either substantially parallel to or perpendicular to its longitudinal axis. The adjustable axle may be a drive axle and also may be steerable by various linkage attached to the steering mechanism. A second supporting axle may be removably attached to the combine frame in a corresponding position relative to the operative position in which the adjustable or drive axle is located.

10 Claims, 11 Drawing Figures

REVERSIBLE CHASSIS FOR SELF-PROPELLING COMBINES

RELATED APPLICATION

An application on the subject invention was first filed by applicant in Germany on Jan. 15, 1971 and by virtue of such foreign application a right of priority is hereby claimed.

BACKGROUND OF THE INVENTION

1. Field of the Invention

This invention relates to a combine capable of being driven in a direction substantially parallel to or perpendicular to its longitudinal axis by means of one or more axles being re-oriented into different operative positions dependent upon the desired direction of travel or use of the combine.

2. Description of the Prior Art

The majority of the combines prevailing on the market at this time operate on the basis of the longitudinal flow principals. More particularly these combines primarily are used as self-propelled units and have their cutting mechanism located ahead of the machine and substantially parallel to its longitudinal axis. Owing to the limited speed of travel, heavy duty machines in particular require wide cutting mechanisms. On conventional or most prior art machines the efficient cutting action is desirous for cutting width while this large width is substantially larger than the given cutting width. This means that it will be very difficult or impossible to drive such a combine through narrow passages and on public roads. This occurs, as pointed out above, because most prior art combines are designed to travel in a direction perpendicular to the longitudinal axis thereof.

In order to overcome the disadvantages of excessive width, there have been combine designs comprising removable cutting mechanisms, wherein the cutting mechanism is designed to be pulled on a trailer behind the combine. In addition, prior art combine designs exist which comprise laterally hinged cutting mechanism halves. This type of structure can reduce the overall combine width to the width of the drive wheels thereby allowing the structure to travel over public roads. Another method of overcoming this problem includes the cutting mechanisms of a combine having various portions arranged in sliding telescopic relation to one another such that the width of the cutting mechanism may be reduced and likewise the overall combine width may be reduced to the external width of the drive axle wheels.

The larger dimension of the prior art combines transverse to the direction of travel results in problems in their transportation on railway cars or by trucks on public roads.

The prior art designs, as set above, which have been proposed to overcome problems existing in the prior art are obviously overly complex and therefore expensive to manufacture and maintain. In addition, due to their relatively sophisticated structure, the durability and reliability of these devices are less than desirable.

SUMMARY OF THE INVENTION

The present invention is aimed at eliminating problems existing in the industry with known combine structures. Generally these problems are eliminated by reversing or relocating the drive axle of a combine so as to selectively change its intended direction of travel relative to the longitudinal axis of the machine. More particularly, the steerable drive axle located behind the threshing mechanism and the walker in the combine field operating position is rotated by 90° around a vertical axis. The support wheels mounted ahead or on the side of the cutting mechanism, in the combine field operating position, are fitted in a way that their axles are parallel to the longitudinal axis of the combine.

In the field operating position, the driven steerable axle is connected to the frame of the combine by two brackets which may have a parallelgram configuration. The weight of the combine rests on that drive axle via two hydraulic lift cylinders. This type of axle-mounting permits the drive axle to adapt to the contours of the ground or surface over which the combine travels, independent of the machine housing or frame or the combine. At the same time this cylinder mounting arrangements serves the height of the cutter bar and the entire combine, to adjust respectively.

Driving power to the steer axle is transmitted from an engine, either via a variator, a gearbox and a telescoping universal shaft, or via a hydrostatic transmission arrangement.

A support wheel and axle assembly are located behind dividers which serve to part or separate the crop for harvesting. There is one hydraulic lift cylinder for each support wheel of the support wheels axle assemblies which permits a hydraulic adjustment of the cutting height and the entire machine height, respectively, over the axle of the support wheels.

In order to arrange the combine into its road traveling or transporting position, all hydraulic lift cylinders used for the height adjustment of the combine are extended into their maximum position, with the exception of the cylinder which supports the combine on the one side of the steerable drive axle is rotated (manually or by engine power) on this one wheel. This rotation takes place in the direction of travel and the path of travel is defined by a substantial arc 90° around a vertical axis located adjacent to the opposite drive wheel from which is traveling. In order to allow the drive wheel being rotated to travel through its full 90° arc, the cutter bar located in the path thereof is hinged to the table pan of the combine so as to allow it to be folded upwards.

The support wheels and axle assembly is mounted behind or inside dividers and are attached to the frame by connection means which allow the assembly to be easily disconnected. The assembly is attached to the rear of the combine on both sides of the grain and straw conveyor when the combine is placed in the road transport position.

In order to maintain steering geometry of the drive axle, the latter carries two pairs of steering control disposed on the front and to the rear respectively. These are connected by one telescopic track rod mounted in frontof or behind the axle is locked.

This invention accordingly comprises the features of construction, combination of elements, and arrangements of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the follow-

Figure 1:
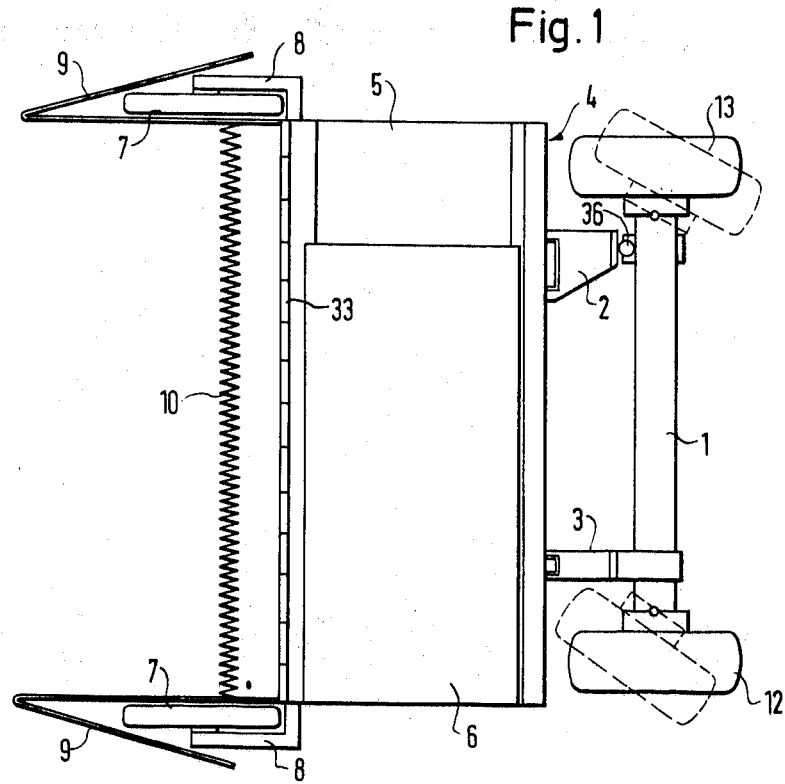

3 ing detailed description taken in connection with the accompanying drawing in which:

FIG. 1 shows the combine of the present invention in field operating position.

Figure 2:
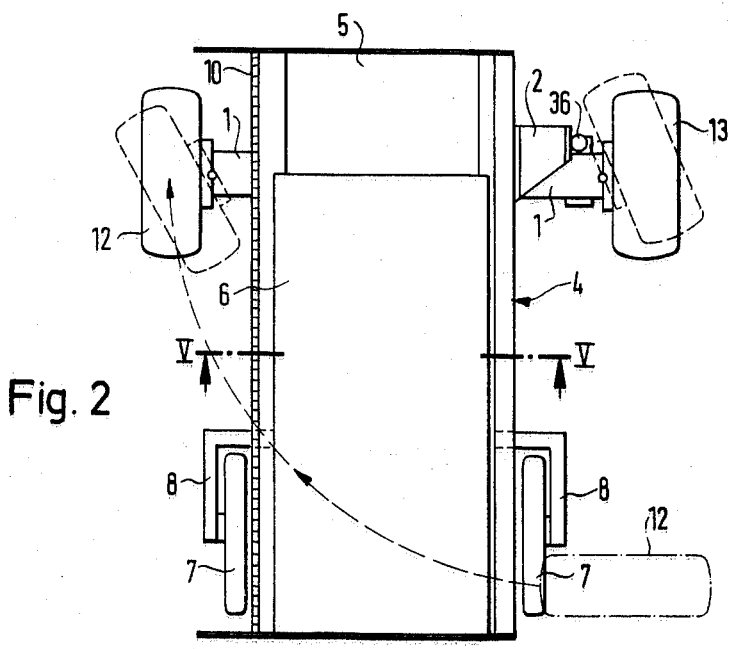

FIG. 2 shows the combine in road transport position.

Figure 3:
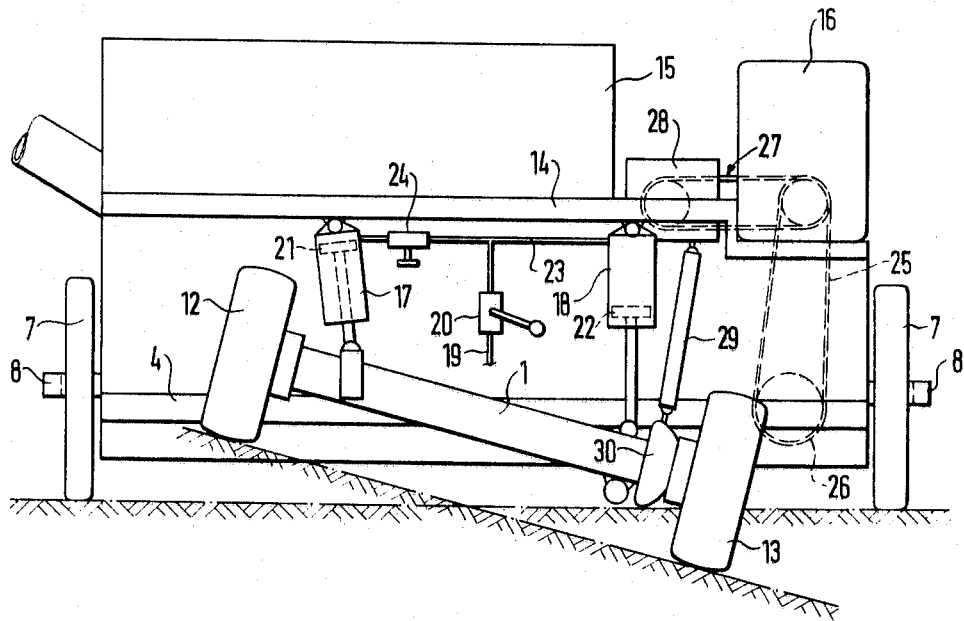

FIG. 3 is a rear view of the combine in field operating position on undulating ground.

Figure 4:
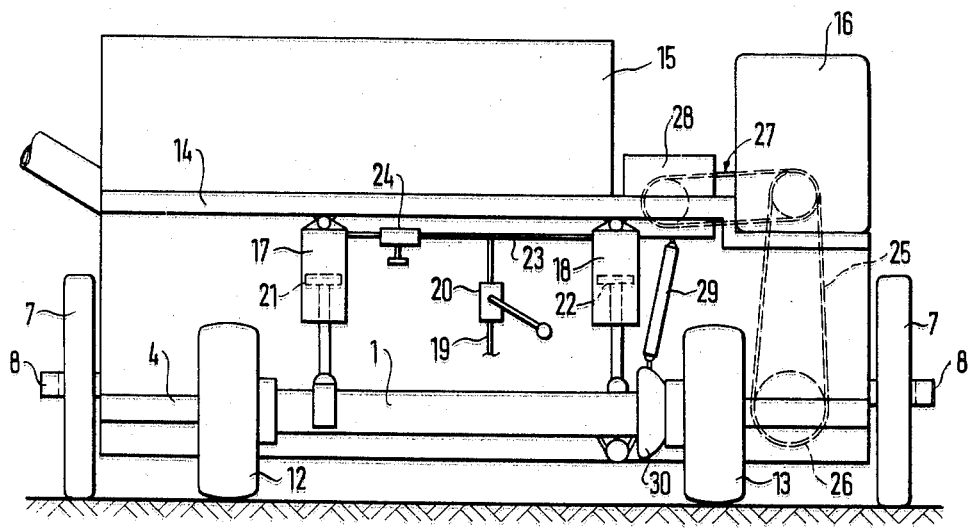

FIG. 4 is a rear view of combine in field operating position on level ground.

Figure 5:
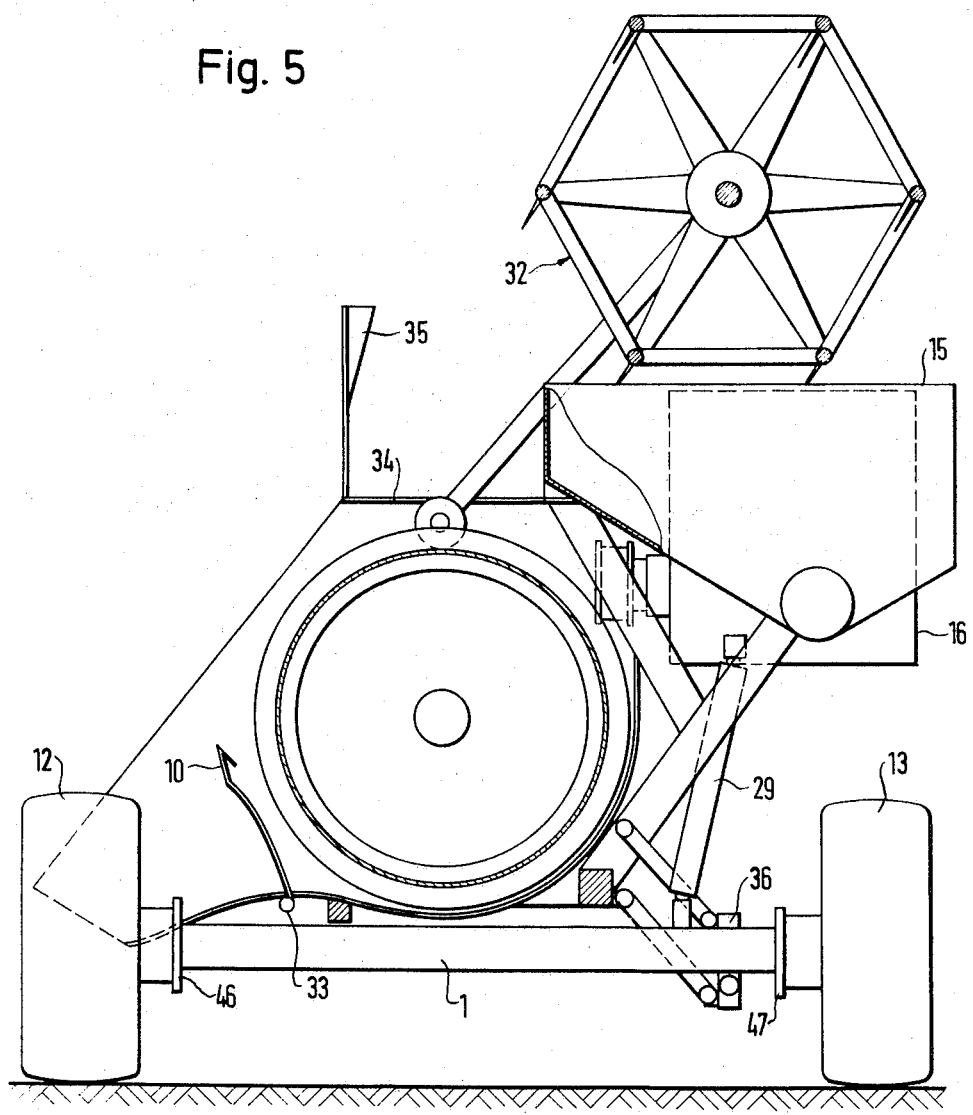

FIG. 5 is a sectional view taken along lines 5—5 of FIG. 2 of combine in road transport position.

Figure 6:
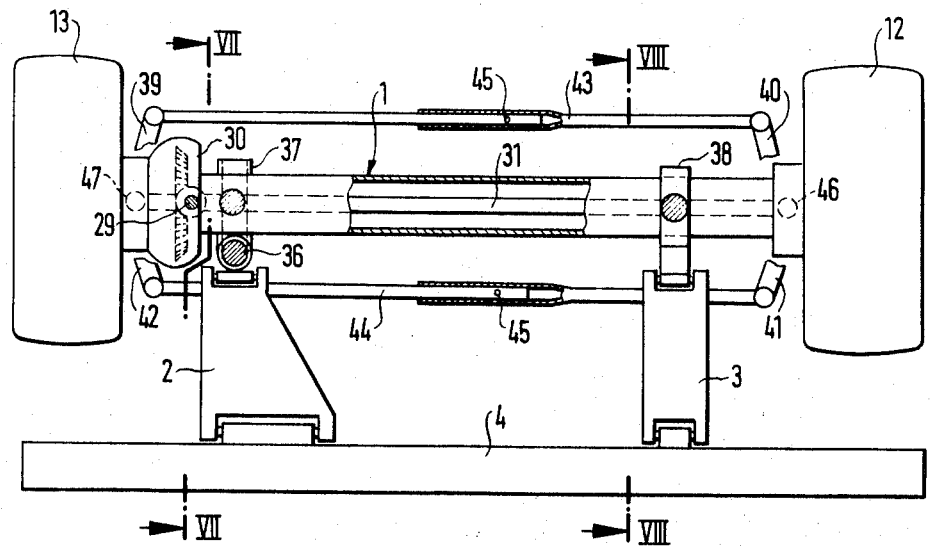

FIG. 6 shows in detail the steerable drive axle.

Figure 7:
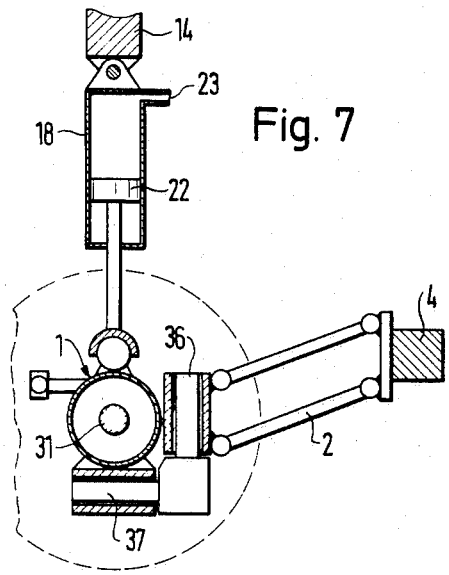

FIG. 7 is a sectional view taken along lines 7—7 of FIG. 6.

Figure 8:
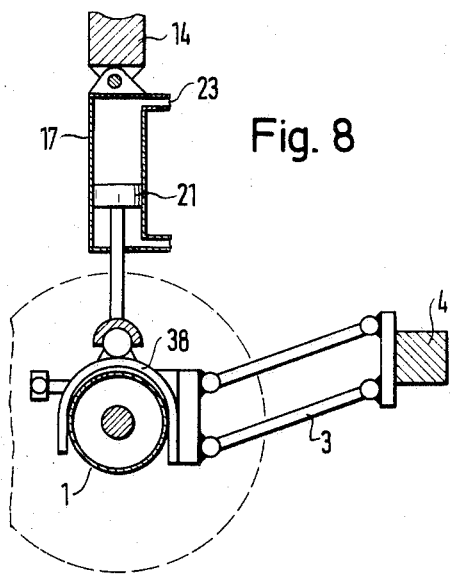

FIG. 8 is a sectional view taken along lines 7—7 of FIG. 6.

Figure 9:
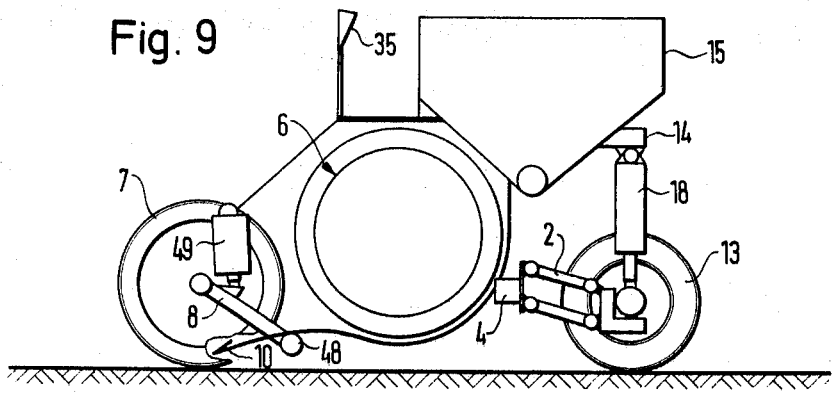

FIG. 9 is a lateral view of combine in field operating position.

Figure 10:
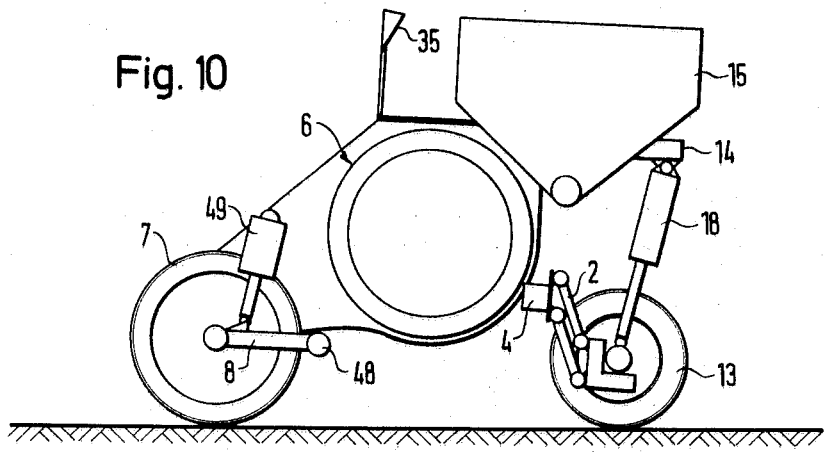

FIG. 10 is a lateral view of combine with cutting mechanism in upper position.

Figure 11:
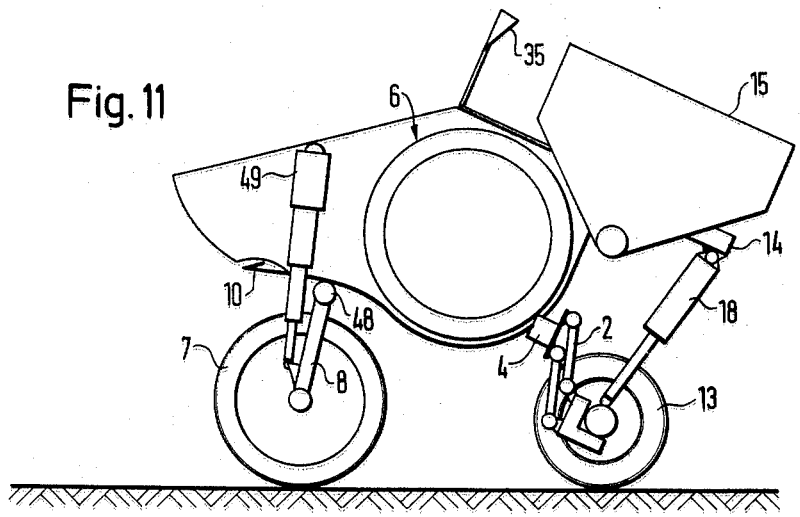

FIG. 11 is a lateral view of combine in top position to permit swing of steerable drive axle into the road transport position.

Similar reference characters refer to similar parts throughout the several views of the drawings.

DETAILED DESCRIPTION

In the combine shown in FIG. 1, the steerable drive axle 1 is connected to the combine frame 4 at the rear of the threshing mechanism 5 and the grain and straw conveyor 6 by means of brackets 2 and 3. The front support wheels 7 are connected to the combine within the dividers 9 by height-adjustable axle means 8. As the combine moves through the crop being harvested, the crop standing in front of the support wheels 7 is parted evenly by the dividers 9 in a way preventing any crushing of the stalks. The cutter bar 10 of the cimbine is located between the support wheels 7 and parallel to the grain and straw conveyor 6.

FIG. 2 shows a combine in road transport position. The steerable drive axle 1 has been rotated through 90° around a vertical pin 36. The cutter bar 10 has been folded upwards around a hinge type connection 33 (FIG. 5) in order to gain sufficient space to accommodate the drive wheel 12 of drive axle 1 when so positioned. The dividers 9 may be removed while the front support wheels 7 are detached from the front of the combine (FIG. 1). Wheels are then connected to the frame 4 of the combine (FIG. 2) to serve as rear running wheels 7.

FIGS. 3 and 4 are rear views of the combine in field operating position. In FIG. 3 the front and rear wheels are at different ground levels due to the configuration of the terrain. However, the standing position of the combine in FIG. 4 is on one level.

The grain tank 15 and the engine 16 are connected to the main frame 4 of the combine. The upper portion 14 of the combine frame 4 is supported on the steerable drive axle 1 by means of two hydraulic lift cylinders 17 and 18. With the control valve 20 opened, a hydraulic pump directs oil via the hydrualic line 19 into the two lift cylinders 17 and 18. This causes the pistons 21 and 22 of those cylinders 17 and 18 (FIGS. 8 & 7) to move downward and increases the ground clearance of the combine.

On undulating ground, the steerable drive axle 1 can adapt to the configuration of the surface soil independent of the support wheels 7 that give the combine its ground guidance. This is ensured by the hydraulic line 23 connecting the two lift cylinders in a manner displacing the oil from that cylinder containing the higher pressure. The oil is then channeled via line 23 into the lift cylinder of lower pressure, causing the position of axle 1 to change in an approximately horizontal direction relative to frame 4 through the action of the brackets 2 and 3 that function independent of each other.

To change the steerable drive axle 1 from its field operating into the road transport position, the combine is brought into its lowest position by retracting the hydraulic lift cylinders 17 and 18. The hydraulic stop cock 24 is then closed to interrupt the flow of oil to lift cylinder 17. Operation of the control valve 20 will extend lift cylinder 18 again and bring the combine into its uppermost position (FIG. 11). The drive axle 1 is then swung on its wheel 12 through 90° around the vertical axis 36 into road transport position.

A drive to the threshing mechanism is taken from the engine 16 via the drive belt 25 to the drive pulley 26 of the threshing mechanism (FIG. 4). Similarly, drive to the steerable drive axle is taken from the engine 16 via a power takeoff means 27 which may be in the form of a belt as shown to the gearbox 28 and thence via a telescoping universal shaft 29 to the differential gear 30 of FIG. 6 and via the drive shaft 31 to the drive wheels 12 and 13.

As shown in FIG. 5, the overall width of the combine is kept as small as possible by hinging harvesting reel 32 to move upwards from its operating position in front of the cutter bar 10 and over the grain tank 15 and the engine 16. The cutter bar 10 has been folded upwards by means of the movable shaft 33 to which it is attached in order to provide sufficient space for the operation of the drive wheel 12 when repositioned for transport purposes.

When in operation, the machine is controlled by an operator who has a view over the essential working elements from a foot bridge 34. The operator can read off the controls from instruments located 'n instrument panel 35 positioned in front of him.

FIGS. 6, 7 and 8 show details of the steerable drive axle. The axle is movably connected to the main frame 4 of the combine via parallegram brackets 2 and 3 serving as links. The pins 36 and 37 connected to the parallelgram 2. The links fitted between the linkage bracket 2 and the axle 1 permit an unimpeded movement of the drive axle 1. While the vertical pin 36 ensures the rotation of the drive axle 1 through 90° from the operating or harvesting position to the transport position, the horizontal pin 37 permits the drive axle to move substantially independent of the remainder of the combine due to the indulations in the ground.

The linking bracket 3 with stop 38 is pressed against the drive axle 1 by the lift cylinder 17 so as to ensure parallel action of the drive axle during combine operation.

The bracket 3 of drive axle 1 with its associated linkage remains idle because of lift cylinder 17 being the axle is oriented to allow the combine to travel in the road transport position.

Steering control of the drive axle is of the hydrostatic system type and includes an hydraulic lift cylinder which acts on the steering control arm 39. In order to ensure proper steering geometry in either axle position, the steerable drive axle 1 is fitted with two pairs of control arms 39 and 40 as well as 41 and 42. The pairs of control arms are connected by the telescopic track rods 43 and 44. When the combine is in operating position, bolt 45 will lock track rod 44 located in front of axle 1. In the combine transport position, bolt 45 locks the track rod 43 located behind axle 1. In either case, the non-locked track rod can freely telescope during the steering action. The drive wheels 12 and 13 perform their steering action by rotational movement about substantially vertical pins 46 and 47 of drive axle 1.

FIG. 9, 10 and 11 show different height adjustments of the combine. The front support wheels 7 are connected by a vertically adjustable attachment 8, in a pivotable manner, to the horizontal axis 48 of the combine. The hydraulic lift cylinder 49 permits the raising or lifting of the cutter bar 10 when it is desired that the position of the drive axle of the combine to be adjusted. The intermediate height adjustment of the cutter bar by the hydraulic lift cylinder 49 as represented in FIG. 10, is sufficient for the machine to be turned from the operating position in the field and to be used for short-distance material handling tasks.

Setting of the maximum cutter bar height, as achieved in FIG. 11 by full extension of lift cylinder 49, is required to permit swinging the steerable drive axle 1 into road transport position.

It will thus be seen that the objects made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described,
What is claimed is:

1. A combine structure of the type having a substantially larger dimension along the longitudinal axis then along the transverse axis thereof, said structure comprising: a frame, a drive axle movably mounted on said frame, a substantially vertically oriented pin connected to said drive axle and said frame, said drive axle movably mounted relative to said frame to rotate about a substantially vertical axis of said pin, whereby said drive axle is movable into and out of at least two operative positions disposed at substantially right angles to one another and the primary direction of travel of said combine is defined by the operative position of said drive axle.

2. A combine structure as in claim 1 further including support means interconnected between said combine frame and said drive axle, aid support means being movable relative to both said combine frame and said drive axle so as to permit variation of distance between said combine frame and said drive axle.

3. A combine structure as in claim 2 wherein said support means comprises a plurality of piston and cylinder assemblies interconnected between said drive axle and said combine.

4. A combine structure as in claim 3 further comprising conduit means connected to each of said cylinders of said piston and cylinder assemblies such that said cylinders are interconnected in fluid communicating relation to one another, whereby said support means serves to automatically vary the space between said drive axle and said frame dependent upon the contour of the ground on which said combine is traveling.

5. A combine structure as in claim 1 further comprising steering linkage means connected to said drive axle, said linkage mounted on said combine frame so as to be operatively connected to said axle in either of said two positions.

6. A combine structure as in claim 1 further comprising support wheels assembly means removably connected in one of a plurality of positions on said combine frame, said support wheel assembly positioned in cooperative relation to said drive axle, whereby the position of said support wheel assembly is dependent upon the position of said drive axle.

7. A combine structure as in claim 6 wherein said support wheels assembly means are disposed in front of said drive axle assembly, relative to the primary direction of travel of said combine, when said drive axle is arranged substantially parallel to the longitudinal axis of said combine.

8. A combine structure as in claim 6 wherein said support wheel assembly means is disposed rearwardly of said drive axle, relative to the primary direction of travel of said combine, when said drive axle is disposed substantially parallel to the transverse axis of said combine.

9. A combine structure as in claim 1 further comprising a cutter bar, hinge means interconnecting said cutter bar to said combine so as to allow said cutter bar to be selectively positioned in inoperative position.

10. A combine structure as in claim 1 further comprising a harvesting reel rotatably mounted in substantially parallel relation relative to the longitudinal axis of said combine and pivotally connected to said combine, whereby said reel can be pivoted out of operative position.

* * * * *

UNITED STATES PATENT OFFICE
CERTIFICATE OF CORRECTION

Patent No. 3,763,637    Dated  October 9, 1973

Inventor(s)  Helwig Schmitt

It is certified that error appears in the above-identified patent and that said Letters Patent are hereby corrected as shown below:

Column 3, line 37, "cimbine" should read -- combine --. Column 4, line 41, "'n" should read -- on --. Column 6, line 3, "aid" should read -- said --.

Signed and sealed this 17th day of September 1974.

(SEAL)
Attest:

McCOY M. GIBSON JR.
Attesting Officer

C. MARSHALL DANN
Commissioner of Patents